US012626680B2

(12) United States Patent
Li et al.

(10) Patent No.: US 12,626,680 B2
(45) Date of Patent: May 12, 2026

(54) SYSTEMS AND METHODS FOR FLEXURAL WAVE ABSORPTION BANDPASS FILTERING

(71) Applicant: Toyota Motor Engineering & Manufacturing North America, Inc., Plano, TX (US)

(72) Inventors: Xiaopeng Li, Ann Arbor, MI (US); Taehwa Lee, Ann Arbor, MI (US); Ziqi Yu, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 319 days.

(21) Appl. No.: 18/312,206

(22) Filed: May 4, 2023

(65) Prior Publication Data

US 2024/0371349 A1 Nov. 7, 2024

(51) Int. Cl.
*G10K 11/172* (2006.01)

(52) U.S. Cl.
CPC .................................. *G10K 11/172* (2013.01)

(58) Field of Classification Search
CPC .................................................... G10K 11/172
USPC .......................................................... 181/207
See application file for complete search history.

(56) References Cited

U.S. PATENT DOCUMENTS 4,137,511 A * 1/1979 Jones ................... H03H 9/2463 333/186
4,373,608 A * 2/1983 Holmes ..................... F16F 7/10 181/208
4,492,246 A 1/1985 Prescott et al.
5,499,526 A 3/1996 Muro
6,134,964 A 10/2000 Jaenker et al.
7,312,674 B2 * 12/2007 Duwel ................... H03H 9/586 333/197
7,358,503 B2 4/2008 Fellerman et al.
7,551,058 B1 6/2009 Johnson et al.
(Continued)

FOREIGN PATENT DOCUMENTS

DE 4336112 A1 4/1995

OTHER PUBLICATIONS

Wu et al., "Asymmetric scattering of flexural waves in a parity-time symmetric metamaterial beam," The Journal of the Acoustical Society of America, vol. 146, 2019, pp. 850-862.
(Continued)

*Primary Examiner* — Forrest M Phillips
(74) *Attorney, Agent, or Firm* — Christopher G. Darrow; Darrow Mustafa PC

(57) ABSTRACT

System, methods, and other embodiments described herein relate to absorbing flexural waves. In one embodiment, a system includes a longitudinally extending body that is subject to a flexural wave and a bandpass filter. The band-pass filter transmits a target flexural wave having a particular wavelength and blocks a non-target flexural wave. The bandpass filter includes at least two mechanical resonators coupled to a surface of the longitudinally extending body and aligned in a first linear array along a length dimension of the longitudinally extending body. The at least two mechanical resonators of the first linear array are separated by a distance based on the particular wavelength.

17 Claims, 9 Drawing Sheets

(56) References Cited

U.S. PATENT DOCUMENTS

| | | | | |
|---|---|---|---|---|
| 8,960,365 | B2 * | 2/2015 | Sheng | G10K 11/172 181/207 |
| 9,411,029 | B2 | 8/2016 | Pirkl | |
| 9,466,283 | B2 * | 10/2016 | Yang | G10K 11/175 |
| 9,933,503 | B2 | 4/2018 | Vernickel et al. | |
| 10,284,176 | B1 | 5/2019 | Solal | |
| 10,717,672 | B2 | 7/2020 | Loh et al. | |
| 10,724,994 | B2 | 7/2020 | Van Tooren et al. | |
| 11,022,561 | B2 | 6/2021 | Ziehl | |
| 11,158,299 | B2 * | 10/2021 | Chunren | G10K 11/162 |
| 11,339,545 | B2 * | 5/2022 | Hsu | E01F 8/0017 |
| 11,524,637 | B2 * | 12/2022 | Chang | B60R 13/0884 |
| 11,688,379 | B2 * | 6/2023 | Lee | G10K 11/175 181/286 |
| 2015/0338380 | A1 | 11/2015 | Ziehl et al. | |
| 2017/0115382 | A1 | 4/2017 | Koudar et al. | |
| 2018/0107015 | A1 | 4/2018 | Dümpelmann et al. | |
| 2022/0051650 | A1 | 2/2022 | Lee et al. | |
| 2022/0190231 | A1 | 6/2022 | Li et al. | |
| 2022/0214312 | A1 * | 7/2022 | Lee | G01N 29/11 |
| 2022/0285604 | A1 | 9/2022 | Li et al. | |

OTHER PUBLICATIONS

Schipf et al., "Tunable piezoelectric metamaterial for Lamb waves using periodic shunted circuits," arXiv:2207.07845v1, Jul. 16, 2022, pp. 1-30.
Zhao et al., "Numerical analysis of effective refractive index ultrasonic sensor based on Cantilever arm structure slot-pased dual-micro-ring resonator," International Journal of Modern Physics B, vol. 35, No. 4, 2021, pp. 1-15.
Durdaut et al., "Phase Sensitivity and Phase Noise of Cantilever-Type Magnetoelastic Sensors Based on the ΔE Effect," arXiv:2003.01085v1, Mar. 2, 2020, pp. 1-15.
Casadei et al., "Piezoelectric resonator arrays for tunable acoustic waveguides and metamaterials," Journal of Applied Physics, vol. 112, 2012, pp. 1-6.
Casadei et al., "Broadband vibration control through periodic arrays of resonant shunts: experimental investigation on plates," Smart Materials and Structures, vol. 19, No. 1, 2010, pp. 1-13.
Cardella et al., "Manipulating waves by distilling frequencies: a tunable shunt-enabled rainbow trap," Smart Materials and Structures, vol. 25, 2016, pp. 1-15.
Jain et al., "Emerging Ideas in Nanocantilever based Biological Sensors," arXiv:1305.5729, 2013, pp. 1-17.
Airoldi et al., "Design of tunable acoustic metamaterials through periodic arrays of resonant shunted piezos," New Journal of Physics, vol. 13, Nov. 2011, pp. 1-21.
Chen et al., "Exceptional points enhance sensing in an optical microcavity," Nature, vol. 548, 2017, pp. 192-196.
Su et al., "Research on damage visualization of concrete structures based on electrical resistance tomography," Frontiers in Physics, 2022, pp. 1-12.
Ashida et al., "Non-Hermitian physics," Advances in Physics 69 (3) (2020), pp. 249-435.
Guo et al., "Observation of PT-symmetry breaking in complex optical potentials," Physical review letters, vol. 103, Iss. 9, 2009, 4 pages.
Lee et al., "Topolectrical circuits," Communications Physics 1 (1), 2018, pp. 1-9.
Yoshida et al., "Exceptional rings protected by emergent symmetry for mechanical systems," Physical Review B, vol. 100, Iss. 5, 2019, pp. 1-17.
Fleury et al., "An invisible acoustic sensor based on parity-time symmetry," Nature communications 6 (1), 2015, pp. 1-7.
Zangeneh-Nejad et al., "Active times for acoustic metamaterials," Reviews in Physics, vol. 4, Nov. 2019, pp. 1-17.
Ding et al., "Emergence, coalescence, and topological properties of multiple exceptional points and their experimental realization," Physical Review X, vol. 6, Iss. 2, 2016, 13 pages.
Gear et al., "Unidirectional zero reflection as gauged parity-time symmetry," New Journal of Physics, vol. 19, Iss. 12, 2017, pp. 1-10.
Lin et al., "Unidirectional invisibility induced by PT-symmetric periodic structures," Physical Review Letters, vol. 106, Iss. 21, 2011, pp. 1-4.
Li et al., "Experimental demonstration of extremely asymmetric flexural wave absorption at the exceptional point," Extreme Mechanics Letters, vol. 52, Apr. 2022, pp.
Wang et al., "Extremely asymmetrical acoustic metasurface mirror at the exceptional point," Physical review letters, vol. 123, Iss. 21, Nov. 2019, pp. 1-5.
Hodaei et al., "Enhanced sensitivity at higher-order exceptional points," Nature, vol. 548 (7666), Aug. 2017, pp. 187-191.
Assawaworrarit et al., "Robust wireless power transfer using a nonlinear parity-time-symmetric circuit," Nature, vol. 546 (7658), Jun. 2017, pp. 387-390.
Peng et al., "Parity-time-symmetric whispering-gallery microcavities," Nature Physics, vol. 10, Iss. 5, May 2014, pp. 394-398.
Yi et al., "Asymmetric viscoelastic metamaterials for broad bandgap design and unidirectional zero reflection," Mechanical Systems and Signal Processing, vol. 162, Jan. 2022, pp.
Wang et al., "Coherent perfect absorption at an exceptional point," Science, vol. 373, Iss. 6560, Sep. 2021, pp. 1261-1265.
Sweeney et al., "Perfectly absorbing exceptional points and chiral absorbers," Physical review letters, vol. 122, Iss. 9, Mar. 2019, pp. 1-6.
Zhu et al., "Simultaneous observation of a topological edge state and exceptional point in an open and non-Hermitian acoustic system," Physical review letters, vol. 121, Iss. 12, Sep. 2018, pp. 1-14.
Liu et al., Willis metamaterial on a structured beam, Physical Review X, vol. 9, Iss. 1, 2019, pp. 1-21.
Domínguez-Rocha et al., "Environmentally induced exceptional points in elastodynamics," Physical Review Applied 13 (1), 2020, pp. 1-8.
Cummer et al., "Controlling sound with acoustic metamaterials," Nature Reviews Materials, vol. 1, Iss. 3, Mar. 2016, pp. 1-13.
Chen et al., "A review of tunable acoustic metamaterials," Applied Sciences, vol. 8, Iss. 9, 2018, pp. 1-21.
Ji et al., "Recent progress in acoustic metamaterials and active piezoelectric acoustic metamaterials—a review," Applied Materials Today, vol. 26, Mar. 2022, pp. 1-28.
Popa et al., "Non-reciprocal and highly nonlinear active acoustic metamaterials," Nature communications, vol. 5, Iss. 1, 2014, pp. 1-5.
Popa et al., "Active acoustic metamaterials reconfigurable in real time," Physical Review B, vol. 91, Iss. 22, 2015, pp. 1-7.
Akl et al., "Analysis and experimental demonstration of an active acoustic metamaterial cell," Journal of Applied Physics, vol. 111, Iss. 4, 2012, pp.
Chen et al., "An active mechanical willis meta-layer with asymmetric polarizabilities," Nature communications, vol. 11 Iss. 1, 2020, pp. 1-8.
Li et al., "Shaping elastic wave mode conversion with a piezoelectric-based programmable meta-boundary," Extreme Mechanics Letters, vol. 39, Sep. 2020, pp. 1-18.
Li et al., "An active meta-layer for optimal flexural wave absorption and cloaking," Mechanical Systems and Signal Processing, vol. 149, Feb. 2021, pp. 1-35.
Chen et al., "Realization of active metamaterials with odd micropolar elasticity," Nature communications, vol. 12, Iss. 1, 2021, pp. 1-12.
Li et al., "Acoustic metamaterials capable of both sound insulation and energy harvesting," Smart Materials and Structures, vol. 25, No. 4, 2016, pp. 1-5.
Airoldi et al., "Design of tunable acoustic metamaterials through periodic arrays of resonant shunted piezos," New Journal of Physics, vol. 13, Iss. 11, Nov. 2011, pp. 1-21.
Thomes et al., "Space-time wave localization in electromechanical metamaterial beams with programmable defects," Mechanical Systems and Signal Processing, vol. 167, Part B, Mar. 2022, pp. 1-16.
Trainiti et al., "Time-periodic stiffness modulation in elastic metamaterials for selective wave filtering: theory and experiment," Physical review letters, vol. 122, Iss. 12, Mar. 2019, 17 pages.

(56) References Cited

OTHER PUBLICATIONS

Chen et al., "Enhanced flexural wave sensing by adaptive gradient-index metamaterials," Scientific reports, vol. 6, Iss. 1, 2016, pp. 1-11.
Zhu et al., "Experimental study of an adaptive elastic metamaterial controlled by electric circuits," Applied Physics etters, vol. 108, Iss. 1, 2016, 6 pages.
Hu et al., "Metamaterial beam with graded local resonators for broadband vibration suppression," Mechanical Systems and Signal Processing, vol. 146, Jan. 2021, pp.
Yi et al., "Programmable metamaterials with digital synthetic impedance circuits for vibration control," Smart Materials and Structures, vol. 29, No. 3, 2020, pp. 1-21.
Sugino et al., "Digitally programmable resonant elastic metamaterials," Physical Review Applied, vol. 13, Iss. 6, 2020, pp.
Wang et al., "Multi-resonant piezoelectric shunting induced by digital controllers for subwavelength elastic wave attenuation in smart metamaterial," Smart Materials and Structures, vol. 26, No. 2, 2017, pp. 1-20.
Li et al., "A self-adaptive metamaterial beam with digitally controlled resonators for subwavelength broadband flexural wave attenuation," Smart Materials and Structures, vol. 27, No. 4, 2018, pp. 1-13.
Gripp et al., "Vibration and noise control using shunted piezoelectric transducers: A review," Mechanical Systems and Signal Processing, vol. 112, Nov. 2018, pp. 359-383.
Chen et al., "Elastic-electro-mechanical modeling and analysis of piezoelectric metamaterial plate with a self powered synchronized charge extraction circuit for vibration energy harvesting," Mechanical Systems and Signal Processing vol. 143, Sep. 2020, pp. 1-27.
Nassar et al., "Nonreciprocity in acoustic and elastic materials," Nature Reviews Materials, vol. 5, Iss. 9, 2020, pp. 667-685.
Sugino et al., "Nonreciprocal piezoelectric metamaterial framework and circuit strategies," Physical Review B 102 (1), 2020, 7 pages.
Wu et al., "Asymmetric scattering of flexural waves in a parity-time symmetric metamaterial beam," The Journal of the Acoustical Society of America, vol. 146, Iss. 1, 2019, pp. 850-862.
Doppler et al., "Dynamically encircling an exceptional points in a waveguide: asymmetric mode switching from the breakdown of adiabaticity," Nature, vol. 537, 2016, pp. 76-79.
Zhang et al., "Dynamically encircling exceptional points: in situ control of encircling loops and the role of the starting point," Physical Review X, vol. 8, Iss. 2, Apr. 2018, pp. 1-18.
A. Preumont et al., "Vibration control of active structures: an introduction," 3rd edition, vol. 246, Springer, 2018, 202 pages.
Tang et al., "Active-passive hybrid piezoelectric networks for vibration control: comparisons and improvement," Smart Materials and Structures, vol. 10, No. 4, 2001, pp. 794-806.
Neubauer et al., "Vibration damping with shunted piezoceramics: fundamentals and technical applications," Mechanical Systems and Signal Processing, vol. 36, Iss. 1, 2013, pp. 36-52.
Haus et al., "Waves and fields in optoelectronics," Prentice-Hall, Inc., Englewood Cliffs, NJ, 1984, 402, pp.
Fan et al., "Temporal coupled-mode theory for the Fano resonance in optical resonators," JOSA A, vol. 20, Iss. 3, 2003, pp. 569-572.
Zhang et al., "A metamaterial beam with inverse nonlinearity for broadband micro-vibration attenuation," Mechanical Systems and Signal Processing, vol. 159, Oct. 2021, pp. 1-13.
Allik et al., "Finite element method for piezoelectric vibration," International journal for numerical methods in engineering, vol. 2, Iss. 2, 1970, pp. 151-157.
Li et al. "Observation of an exceptional point with an LR-shunted resonator." Mechanical Systems and Signal Processing 196 (2023): 110297.
Li et al. "Experimental study of a tunable perfect flexural wave absorber with a piezoelectric shunted resonator." Frontiers in Physics 10 (2022): 1306.
Leng et al. "Limits of flexural wave absorption by open lossy resonators: reflection and transmission problems." New Journal of Physics 21.5 (2019): 053003.
Hisu et al. "Bound states in the continuum." Nature Reviews Materials 1.9 (2016): 1-13.
U.S. Appl. No. 18/133,135, filed Apr. 11, 2023.
U.S. Appl. No. 18/133,076, filed Apr. 11, 2023.

* cited by examiner

200

SYSTEMS AND METHODS FOR FLEXURAL WAVE ABSORPTION BANDPASS FILTERING

TECHNICAL FIELD

The subject matter described herein relates, in general, to flexural wave absorption and, more particularly, to an absorption system that filters and transmits target flexural waves while blocking non-target waves.

BACKGROUND

Resonators are used in a variety of industries and for a variety of purposes. High strength-to-mass materials, such as aluminum, provide several advantages in many applications. For example, high strength-to-mass materials are used in vehicles to reduce a weight of the vehicle. However, these high strength-to-mass materials are particularly susceptible to flexural wave transmission. Bending or flexural waves propagating through a structure, such as a vehicle body, may damage the structure or generate unwanted noise in the surrounding environment. The unwanted noise and/or body damage is further exacerbated when the body is formed of a high strength-to-mass material. As such, in these applications, the body may be more prone to damage due to flexural waves and may result in less than desirable acoustic qualities. In this example, a resonator attached to the structure absorbs the flexural waves, thus negating the adverse effects of the propagating wave.

In another example, a resonator may be part of an electrical system. A resonator may detect or generate a precise frequency for sensing, signal processing, and/or digital encoding. For example, a system may rely on sensor data to execute some functionality, such as detecting conditions in a surrounding environment. The sensor data should convey accurate environmental data for the system to perform as intended. If there is too much noise in the sensor data, the system may improperly perform or perform below a desired level. In this example, a resonator may filter out noise such that the system receives and acts upon accurate and reliable sensor data.

SUMMARY

In one embodiment, example systems and methods relate to improving flexural wave absorption by blocking non-target waves from propagating through a body while allowing target waves having a particular wavelength to pass through the body.

In one embodiment, an absorption system for generating a flexural wave bandpass filter is disclosed. The absorption system includes a longitudinally extending body that is subject to a flexural wave. The system also includes a bandpass filter that transmits a target flexural wave having a particular wavelength and blocks a non-target flexural wave. The bandpass filter includes at least two mechanical resonators coupled to a surface of the longitudinally extending body and aligned in a first linear array along a length dimension of the longitudinally extending body. The at least two mechanical resonators of the first linear array are separated by a distance based on the particular wavelength.

In one embodiment, an absorption system for generating a flexural wave bandpass filter is disclosed. The absorption system includes a longitudinally extending body that is subject to a flexural wave. The absorption system also includes a bandpass filter that transmits a target flexural wave having a particular wavelength and blocks a non-target flexural wave. The bandpass filter includes at least two mechanical resonators coupled to a surface of the longitudinally extending body and aligned in a linear array along a length dimension of the longitudinally extending body. The at least two mechanical resonators are separated by a distance that is greater than 0.45λ, where λ is the particular wavelength.

In one embodiment, a method for filtering a flexural wave with a bandpass filter is disclosed. In one embodiment, the method includes receiving a target flexural wave having a particular wavelength at a longitudinally extending body having at least two mechanical resonators formed on a surface. The at least two mechanical resonators are spaced to form a bandpass filter for the target flexural wave. The method also includes 1) transmitting the target flexural wave that propagates through the longitudinally extending body and 2) reflecting a non-target flexural wave that propagates through the longitudinally extending body.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
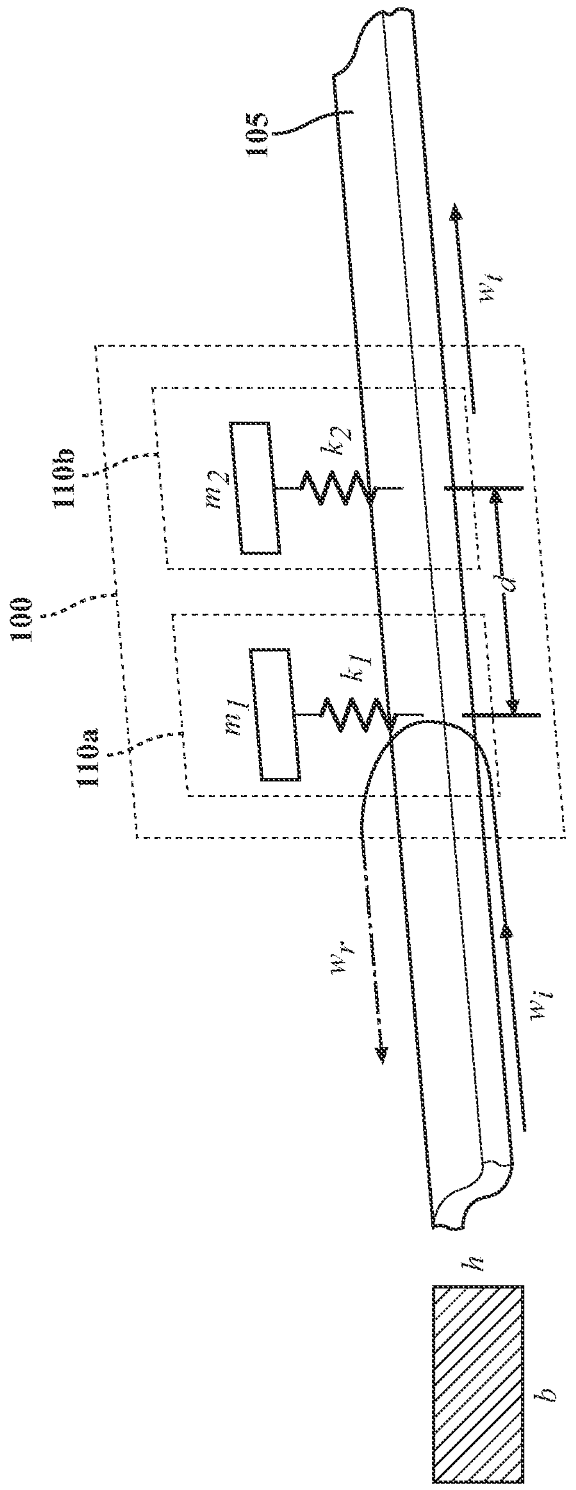
FIG. 1 illustrates one embodiment of a simplified absorption system for transmitting target waves through a body while preventing non-target wave propagation.

Systems, methods, and other embodiments associated with transmitting target flexural waves as they propagate through a body while blocking non-target flexural wave propagation are disclosed herein. Mechanical resonators are used in a variety of applications in a variety of fields. For example, mechanical resonators are used to dampen acoustic noise that arises when flexural waves propagate through a body. In another example, a mechanical resonator is used in a microelectromechanical system (MEMS) for timing references, signal filtering, mass sensing, biological sensing, motion sensing, or for a number of other purposes. Perfect flexural wave absorption systems may be useful in these and many other applications, including structure-born noise mitigation, to totally absorb a flexural wave propagating through a body. However, perfect flexural wave absorption is difficult to achieve, given the intrinsic limitations of mechanical resonators.

Specifically, a mechanical resonator on an elastic structure, such as a metallic beam structure, does not achieve perfect reflection or absorption due to the intrinsic and inherent leakage of the mechanical resonator. That is, when using a mechanical resonator, at least a portion of the energy of a flexural wave propagates past the mechanical resonator such that the mechanical resonator behaves as a damped resonator. Moreover, the energy stored in the resonator is leaked to the host structure, this leakage results in leakage damping. As such, the quality factor (Q factor) of the mechanical resonator is limited by the properties of the mechanical resonator itself and also by the leakage damping. While some systems have incorporated coupled resonators to achieve perfect reflection, such absorption systems are ineffective as filters that transmit select flexural waves as a perfect system absorbs/reflects all flexural waves, and no flexural waves transmit past the mechanical resonators.

The present specification describes an elastic embedded eigenstate with an unbounded Q factor and a narrow passing band. As such, the absorption system of the present specification provides for a flexural wave filter such that target flexural waves are propagated to a downstream system, such as a sensor system, while non-target flexural waves are suppressed. Accordingly, the present system suppresses noise and vibration that would result were non-target flexural waves allowed to propagate past the absorption system.

Specifically, the present absorption system includes at least two mechanical resonators with masses, $m_1$ and $m_2$ respectively, and spring constants, $k_1$ and $k_2$, respectively, that are placed at a distance, d, away from each other on an infinitely long beam having a cross-section b×h. By tuning the distance parameter, d, the present absorption system operates in an embedded state with minimum radiation and infinite Q factor for this pair of resonators. The absorption system also provides a narrow passing band that allows the absorption system to operate as a narrow bandpass filter. As such, the absorption system of the present specification reflects most flexural waves while allowing a target flexural wave with a particular frequency to pass.

That is, the present absorption system operates in a bound state in the continuum (BIC), which has a non-radiating eigenstate that results in an efficient wave filter. The present system filters out specific non-target flexural waves but allows other target flexural waves to pass. As one particular example, the sensor may be mounted on a system and may monitor system performance. In this case, the absorption system is a sensing structure to monitor system health by filtering out specific frequencies and testing the system with a wave at a particular frequency. In this case, the absorption sensor eliminates noise that results from other frequencies.

Due to the non-radiating feature, the absorption system provides an unbounded Q factor. As specific examples, the absorption system of the present specification may be used in wave and/or signal filtering, signal processing, and sensing devices. Such absorption systems may also be used as MEMS resonators for timing references, signal filtering, mass sensing, biological sensing, motion sensing, or various applications.

As used in the present specification and in the appended claims, the term "embedded state" refers to an eigenmode that does not radiate energy to the surroundings.

Further, the term "eigenstate" refers to an eigenvector or eigenmode of a system with the associated eigenvalue.

FIG. 1 illustrates one embodiment of a simplified absorption system 100 for transmitting target flexural waves through a body 105 while preventing non-target wave propagation. In the example depicted in FIG. 1, $w_i$, $w_r$, and $w_t$ refer to the amplitudes of the incident flexural wave, a reflected flexural wave, and a target flexural wave, respectively. As described above, the absorption system 100 presented herein reflects most flexural waves incident upon the body 105 while allowing a target flexural wave to propagate. This is done by adjusting the distance, d, between coupled resonators to provide a flexural wave band gap.

The absorption system 100 includes a longitudinally extending body 105 that is subject to a flexural wave. As depicted in FIG. 1, the body 105 may be a longitudinally extending beam. While FIG. 1 depicts the body 105 as having a particular structure, the body 105 may have any number of different forms, including a plate, pipe, or other structure that can be subject to flexural waves. The body 105 may be an elastic material, such as aluminum or other thin metallic material.

As described above, if left unaddressed, flexural waves could propagate through the body 105 and damage the body 105, generate acoustic noise in the structure to which the body 105 is attached, and/or obfuscate a target signal at a sensor system of which the body 105 is a component. However, rather than fully absorb or reflect the flexural wave, the present absorption system 100 includes a bandpass filter that 1) transmits a target flexural wave having a particular wavelength and 2) blocks non-target flexural waves. The bandpass filter includes at least two mechanical resonators 110*a*, 110*b* coupled to a surface of the longitudinally extending body 105. The mechanical resonators 110*a*, 110*b* are coupled to the body 105 using any one of a number of attachment means, including adhesives press form fittings, screw-type fittings, fasteners, clamps, or any other mechanism for joining one or more separate pieces together.

The at least two mechanical resonators 110*a*, 110*b*, are aligned in a first linear array along a length dimension of the longitudinally extending body 105 and are separated by a distance, d, that is based on the wavelength of the target flexural wave, $w_t$, that is to be allowed to propagate along the body 105. That is, the relative position of the mechanical resonators along the body 105 defines whether or not the absorption system 100 totally reflects/absorbs the incident wave or allows transmission of a specific frequency of the incident wave.

As depicted in FIG. 1, the mechanical resonators 110*a*, 110*b* in the absorption system 100 are separated by a distance dimension, d. In some examples, this dimension may be greater than 0.45λ, where λ is the particular wavelength of the target wave to be transmitted past the absorption system 100. If the distance between the mechanical resonators 110*a*, 110*b* is less than this amount, the incident wave may be totally reflected and/or absorbed such that a downstream component would not experience any energy from the incident wave. Such a system would not operate as a filter. By comparison, the absorption system 100 of the current application includes a bandpass filter to allow at least some flexural waves to propagate.

The bandpass is formed by tuning the distance between the mechanical resonators 110*a*, 110*b* to a distance that allows flexural waves of a specific frequency to pass. For example, given particular mechanical resonator and body 105 material properties, if the distance between the mechanical resonators 110*a*, 110*b* is greater than 0.45λ, such as 0.5λ, then the absorption system 100 exhibits a bandpass at the target wavelength, such that the absorption system 100 filters out non-target waves while allowing target waves to transmit to a downstream component, such as a filter, sensor, or the like.

In one example, the distance between the mechanical resonators 110*a*, 110*b* may be based on the physical properties of the mechanical resonators 110*a*, 110*b* themselves. As such, the target flexural wave that is transmitted past the absorption system 100 may be selected by altering the material and physical properties of the mechanical resonators and/or the material and physical properties of the body 105.

In one example, the distance, d, between mechanical resonators 110*a*, 110*b* is optimized by calculating the reflection and transmission coefficients using a transfer matrix. Specifically, a simplified model with lumped elements is adopted to characterize the absorption performance theoretically using the transfer matrix method. For example, given two mechanical resonators 110*a*, 110*b* with the same mass and spring constant such that $m_1=m_2=m_0$ and $k=k_2=k_0$, given the Euler-Bernoulli thin beam hypotheses, the transmission coefficient equals $T=|t|^2=|w_t/w_i|^2$, the reflection coefficient equals $R=|r|^2=|w_r/w_i|^2$, and the absorption coefficient equals $A=1-T-R$ using transfer matrix method.

Using this transfer matrix method, and given resonator parameters of $m_1=m_2=m_0=9.5903\times10^{-4}$ kilograms (kg), $k_1=k_2=k_0=9.1431\times10^4$ Newtons per meter (N/m) and an aluminum body 105 having a cross-sectional area of 12.7 millimeters (mm)×3.127 mm, a Young's Modulus of 70 gigaPascal (Gpa), a density of 2700 kg/m$^3$, and Poisson's ratio of 0.33, the calculated distance, d, is 0.5, using the transfer matrix method, with λ being the target wavelength to transmit past the absorption system 100. As such, the absorption system 100 would include a band pass filter for flexural waves with a wavelength λ, while waves with other frequencies would be totally absorbed or reflected. In this example, a particular flexural wave may be targeted for transmission past the absorption system 100 by placing the mechanical resonators 110*a*, 110*b* with a distance, d, between them that is 0.5λ. Any flexural wave with a frequency of 1.055 $f/f_0$, where $$f_0 = \frac{1}{2\pi}\sqrt{k_0/m_0}$$

would totally pass by the absorption system 100 to a downstream component, while flexural waves with a frequency greater than or less than 1.055 f/f_0 would be partially reflected.

The mechanical resonators 110*a*, 110*b* themselves may take a variety of forms. In one example, each mechanical resonator 110*a*, 110*b* includes a rigid mass component and a connecting element connected to the rigid mass component. The connecting element maintains the rigid mass component at an elevated distance from the longitudinally extending body 105 when the mechanical resonator 110*a*, 110*b* is in a rest position. In the example depicted in FIG. 1, the connecting element of the mechanical resonator 110*a*, 110*b* is a spring. The spring exerts a force to maintain the mass elements $m_1$, $m_2$ at an elevated position away from the body 105 when the absorption system 100 is at rest. While particular reference is made to particular resonator configurations, the mechanical resonators 110*a*, 110*b* may take other forms, such as those depicted in FIGS. 3-10.

Thus, the absorption system 100 of the present specification reflects/absorbs most flexural waves while allowing specific target flexural waves to pass the absorption system 100 to a downstream system. As such, the absorption system 100 may operate as a filter for a sensing system, signal processing system, or another type of downstream component.

Figure 2:
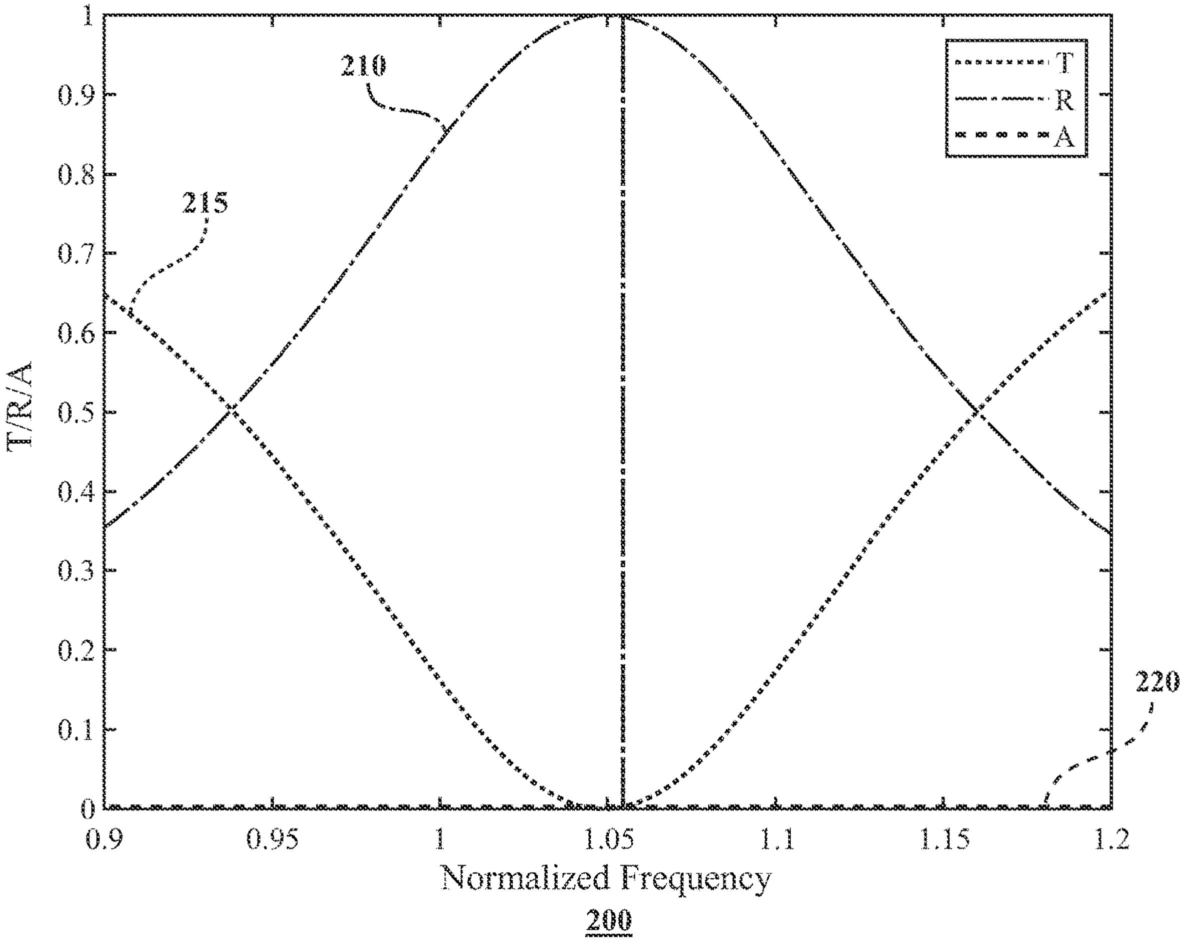
FIG. 2 illustrates an example graph of the transmission (T), reflection (R), and absorption (A) spectra of a bandpass filter of the simplified absorption system for transmitting target waves through a body while preventing non-target wave propagation.

FIG. 2 illustrates an example graph 200 of the transmission (T), reflection (R), and absorption (A) spectra of a bandpass filter of the simplified absorption system 100 that transmits target waves through a body 105 while preventing non-target wave propagation. The graph 200 pertains to an absorption system 100 with two identical mass-spring resonators having an optimized distance, d, of 0.5λ. In the graph 200, a first line 210 depicts the reflection spectrum (R), a second line 215 depicts the transmission spectrum (T), and a third line 220 depicts an absorption spectrum (A) for a band-passing absorption system 100. As depicted in FIG. 2, rather than being a perfect absorber, the mechanical resonators 110*a*, 110*b* of the absorption system 100 are spaced at a distance greater than 45% of the wavelength of a target, and filtered, flexural wave such that target flexural waves propagate through the absorption system 100. The reflection spectrum includes a steep valley, and the transmission spectrum includes a steep peak around a normalized frequency of about 1.055. This exemplifies the bandpass nature of the absorption system 100 based on the spacing distance, d, of the mechanical resonators 110*a*, 110*b*. As such, the absorption system 100 operates in the embedded state with minimum radiation, an infinite Q factor, and a narrow passing band represented by the steep drop in the reflection spectrum around a normalized frequency value of about 1.06.

Figure 3:
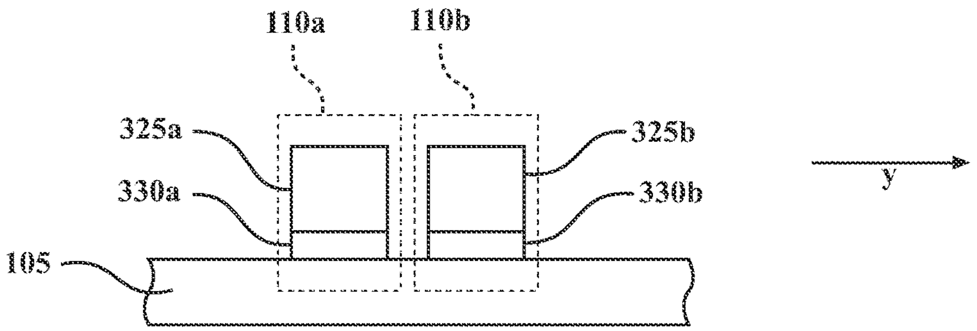
FIG. 3 illustrates one embodiment of at least two mechanical resonators of the bandpass filter of the absorption system.

FIG. 3 illustrates one embodiment of at least two mechanical resonators 110*a*, 110*b* of the bandpass filter of the absorption system 100. As described above, the mechanical resonators 110*a*, 110*b* may take one of a variety of forms. In one particular example, each mechanical resonator 110*a*, 110*b* includes a rigid mass component 325*a*,

325*b* and a connecting element connected to the rigid mass component 325*a*, 325*b*. The connecting element maintains the rigid mass component 325*a*, 325*b* at an elevated distance away from the longitudinally extending body 105 when the absorption system 100 is in a rest position. In the example depicted in FIG. 3, the connecting element is a soft base component 330*a*, 330*b*. Specifically, the soft base component 330*a*, 330*b* is formed of a material that is less rigid, or softer, than the rigid mass component 325*a*, 325*b*. The soft base component 330*a*, 330*b* may be a flexible rubber or plastic component with an axial stiffness that can be easily customized based on the specific material selection. In an example, the soft base component 330*a*, 330*b* is the same composition as the mechanical resonators 110*a*, 110*b* in each array. In another example, different arrays use different material compositions for the soft base component 330*a*, 330*b* to customize the acoustic system, for example, to provide the individual arrays of mechanical resonators with different resonant frequencies.

Figure 4:
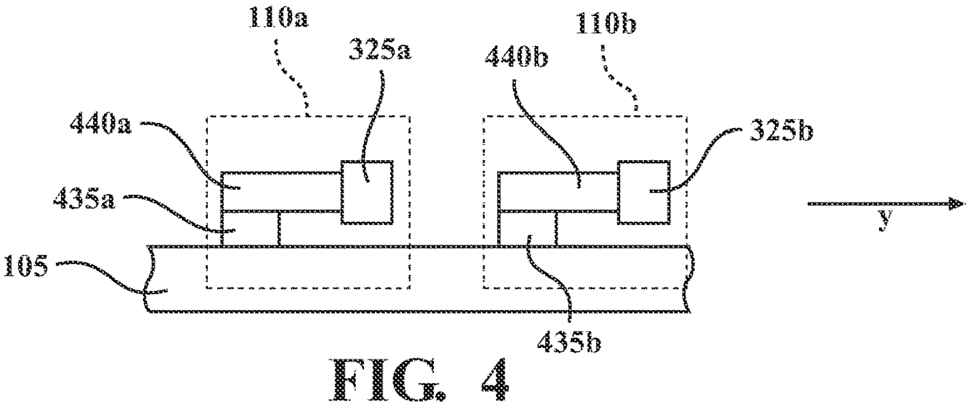
FIG. 4 illustrates one embodiment of at least two mechanical resonators of the bandpass filter of the absorption system.

FIG. 4 illustrates one embodiment of at least two mechanical resonators 110*a*, 110*b* of the bandpass filter of the absorption system 100. In this example, the connecting member that elevates a respective rigid mass component 325*a*, 325*b* includes a rigid base component 435*a*, 435*b* and an arm 440*a*, 440*b*. The arm 440*a*, 440*b* extends at an angle from the rigid base component 435*a*, 435*b* and provides a customized bending stiffness. The arm 440*a*, 440*b* may be angled with respect to the rigid base component 435*a*, 435*b* (shown in FIG. 4 at an angle of 90 degrees with respect to the rigid base component 435*a*, 435*b* and parallel to the body 105). The arm 440*a*, 440*b* is configured to move up and down in an angular direction/movement with respect to the rigid base component 435*a*, 435*b*.

In an example, the arm 440*a*, 440*b* and/or the rigid base component 435*a*, 435*b* are made of a thin metal, rubber, or plastic material. In an example, the arm 440*a*, 440*b* and rigid base component 435*a*, 435*b* form a single structural component that couples the rigid mass component 325*a*, 325*b* to the body 105. In another example, the rigid base component 435*a*, 435*b* and the arm 440*a*, 440*b* are different components, potentially made of different materials. If different materials, the rigid base component 435*a*, 435*b* may be secured to both the longitudinally extending body 105 and the arm 440*a*, 440*b*, which has an opposite end that is secured to the rigid mass component 325*a*, 325*b* configured for maintaining the rigid mass component, 325*a*, 325*b* at an elevated distance from the upper major surface of the longitudinally extending body 105.

The rigid base component/arm configuration of the mechanical resonator 110*a*, 110*b* may also take one of a variety of forms. For example, as depicted in FIG. 4, arms 440*a*, 440*b* of the at least two mechanical resonators 110*a*, 110*b* may extend in the same direction along a length dimension, y, of the longitudinally extending body 105. Put another way, the arms 440*a*, 440*b* extend away from the respective rigid base components 435*a*, 435*b* in the same direction along the length dimension, y, of the body 105.

Figure 5:
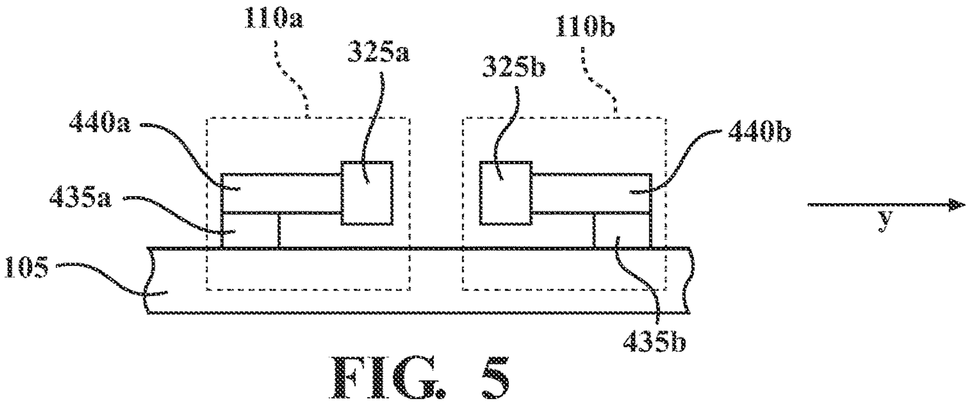
FIG. 5 illustrates one embodiment of at least two mechanical resonators of the bandpass filter of the absorption system.

In another example depicted in FIG. 5, the arms 440*a*, 440*b* of the at least two mechanical resonators 110*a*, 110*b* extend in opposite directions along the length dimension, y, of the longitudinally extending body 105. Put another way, in this example the arms 440*a*, 440*b* extend away from the respective rigid base components 435*a*, 435*b* in different directions along the length dimension, y, of the body 105. In the example depicted in FIG. 5, the rigid mass components 325*a*, 325*b* of the at least two mechanical resonators 110*a*, 110*b* are adjacent to one another. With the coordinate system depicted in FIG. 5, an arm 440*a* of a first mechanical resonator 110*a* extends to the right. In contrast, an arm 440*b* of a second mechanical resonator 110*b* extends to the left.

Figure 6:
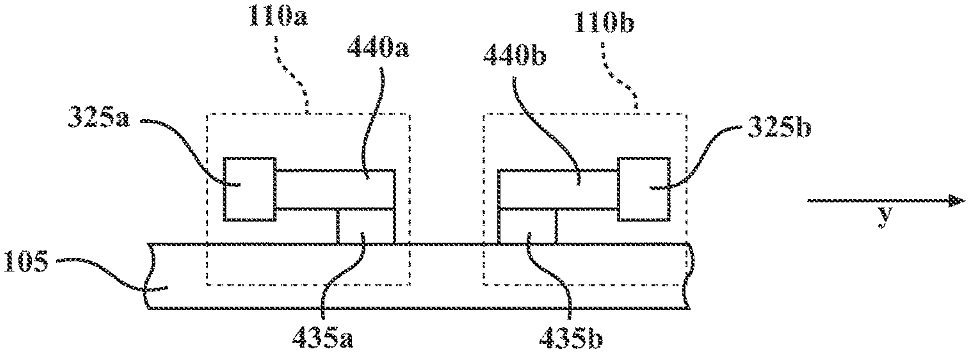
FIG. 6 illustrates one embodiment of at least two mechanical resonators of the bandpass filter of the absorption system.

In another example depicted in FIG. 6, the arms 440*a*, 440*b* of the at least two mechanical resonators 110*a*, 110*b* extend in opposite directions along the length dimension, y, of the longitudinally extending body 105. In the example depicted in FIG. 6, the rigid mass components 325*a*, 325*b* of the at least two mechanical resonators 110*a*, 110*b* are separated by respective arms 440*a*, 440*b*. With the coordinate system depicted in FIG. 6, an arm 440*a* of a first mechanical resonator 110*a* extends to the left. In contrast, an arm 440*b* of a second mechanical resonator 110*b* extends to the right. In each of these examples, the exact distance, d, between the mechanical resonators 110*a*, 110*b* may take into account the configuration such that the distance, d, is slightly different between absorption systems 100 having different configurations.

Figure 7:
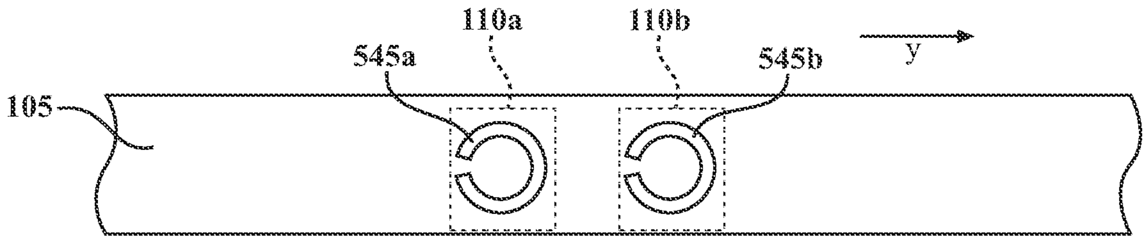
FIG. 7 illustrates one embodiment of at least two mechanical resonators of the bandpass filter of the absorption system.

FIG. 7 illustrates one embodiment of at least two mechanical resonators 110*a*, 110*b* of the bandpass filter of the absorption system 100. In this example, the mechanical resonators 110*a*, 110*b* include channels 545*a*, 545*b* etched into a surface. The channels 545*a*, 545*b* may be formed in any of a number of ways, including laser machining, computer numerical control (CNC) machining, or etching, to name a few. The channels 545*a*, 545*b* having different physical properties than the matrix of the body 105, alter the response to a propagating flexural wave. As such, the channel properties, i.e., dimensional and shape properties, may be selected such that the channels 545*a*, 545*b* block certain flexural waves, i.e., non-target flexural waves, while target flexural waves are allowed to pass.

Figure 8:
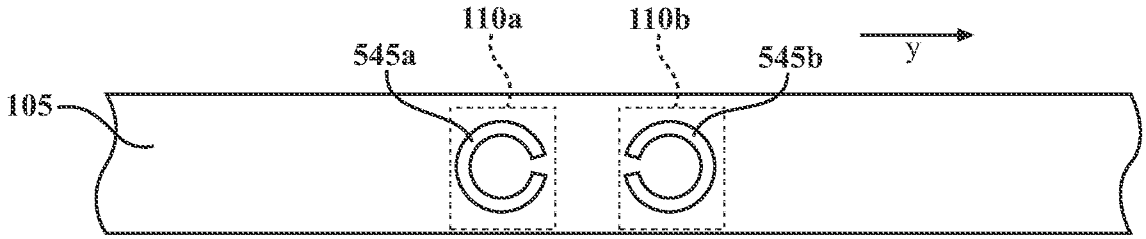
FIG. 8 illustrates one embodiment of at least two mechanical resonators of the bandpass filter of the absorption system.
Figure 9:
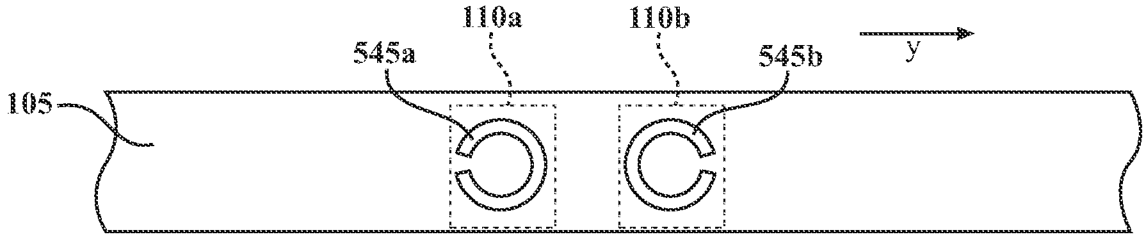
FIG. 9 illustrates one embodiment of at least two mechanical resonators of the bandpass filter of the absorption system.
Figure 10:
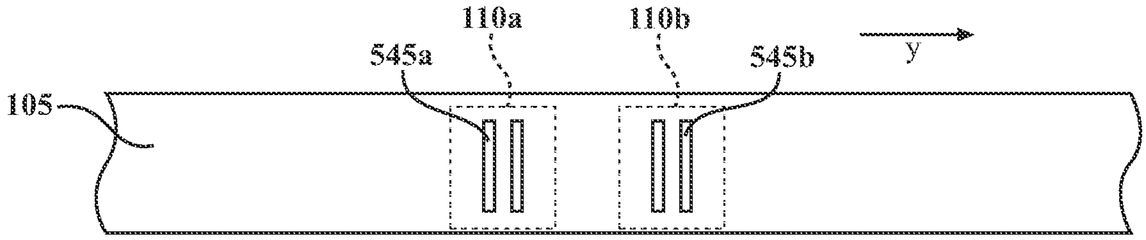
FIG. 10 illustrates one embodiment of at least two mechanical resonators of the bandpass filter of the absorption system.

As depicted in FIGS. 7-10, the form of channels 545*a*, 545*b* may be one of a variety of shapes. Specifically, as depicted in FIG. 7, the channels 545*a*, 545*b* may be C-shaped channels 545*a*, 545*b* with openings in the C-shape on the same side along a length dimension of the body 105. By contrast and as depicted in FIGS. 8 and 9, the openings of the C-shaped channels 545*a*, 545*b* may be opposite, with the openings facing one another or directed away from one another. Another configuration is depicted in FIG. 10, where the channels 545*a*, 545*b*, are parallel aligned slots. As with the examples depicted in FIGS. 3-7, the exact distance, d, between the mechanical resonators depends on the particular configuration and is set such that the reflection, transmission, and absorption spectra of the resulting absorption system 100 exhibits a bandpass behavior at a particular frequency. While FIGS. 3-10 depict specific examples of mechanical resonators 110*a*, 110*b*, the mechanical resonators 110*a*, 110*b* of the absorption system 100 may take other forms so long as a bandpass filter is generated based on the spacing of the mechanical resonators 110*a*, 110*b*.

Figure 11:
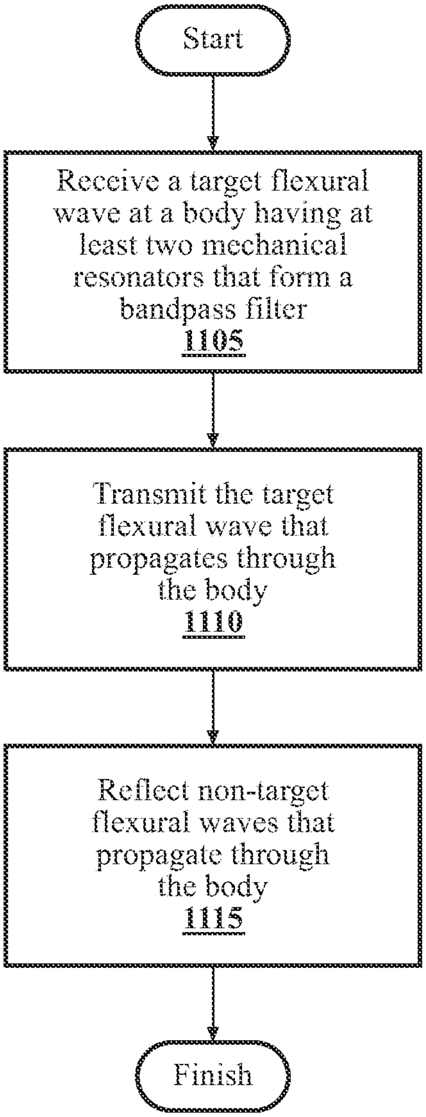
FIG. 11 illustrates one embodiment of a method that is associated with filtering a flexural wave as it propagates through a body.

Additional aspects of flexural wave absorption will be discussed in relation to FIG. 11. FIG. 11 illustrates a flowchart of a method 1100 that is associated with absorbing a flexural wave. Method 1100 will be discussed from the perspective of the absorption system 100 of FIGS. 1 and 2. While method 1100 is discussed in combination with the absorption system 100, it should be appreciated that the method 1100 is not limited to being implemented within the absorption system 100 but is instead one example of a system that may implement the method 1100.

At operation 1105, the absorption system 100 receives a target flexural wave having a particular wavelength. That is, the absorption system 100 is positioned at some location of a longitudinally extending body 105. The absorption system 100 includes two mechanical resonators 110*a*, 110*b* that are spaced to form a bandpass filter for the target flexural wave. In use, it may be desirable to allow a flexural wave with a particular frequency to pass while blocking others. Such a system may be implemented as a noise-reducing component of a larger filtering, sensing, and/or monitoring system. As such, the absorption system 100 may be tuned to a particular target flexural wave for propagation.

As described above, using the transfer matrix method, a distance, d, for the mechanical resonators of the absorption system 100 may be determined based on the properties of the mechanical resonators 110*a*, 110*b*, and the body 105. This distance is defined in terms of the wavelength, λ, that will transmit through the bandpass filter of the system and is determined by multiplying the wavelength by a multiplier value. For example, if a target flexural wave has a wavelength of 132 millimeters and the determined distance parameter is 0.5λ, the mechanical resonators 110*a*, 110*b* may be spaced 66 millimeters away from one another to allow transmission of the 1639 Hz wave while absorbing/reflecting flexural waves that have different wavelengths.

At operation 1110, the absorption system 100 transmits the target flexural wave propagating through the longitudinally extending body 105. At operation 1115, the absorption system 100 reflects non-target flexural waves propagating through the longitudinally extending body 105. Thus, the absorption system 100 allows for the selective transmission of specific target flexural waves while preventing the passage of other non-target flexural waves. In one example, the distance between the mechanical resonators 110*a*, 110*b* may be adjusted based on the target width of the bandpass filter. That is, as depicted in FIGS. 13A-13D, the width of a bandpass filter may vary based on the target flexural wave frequency to which the absorption system 100 is tuned. However, it should be noted that increasing the width of the bandpass filter reduces the Q factor for the associated absorption system 100.

Figure 12:
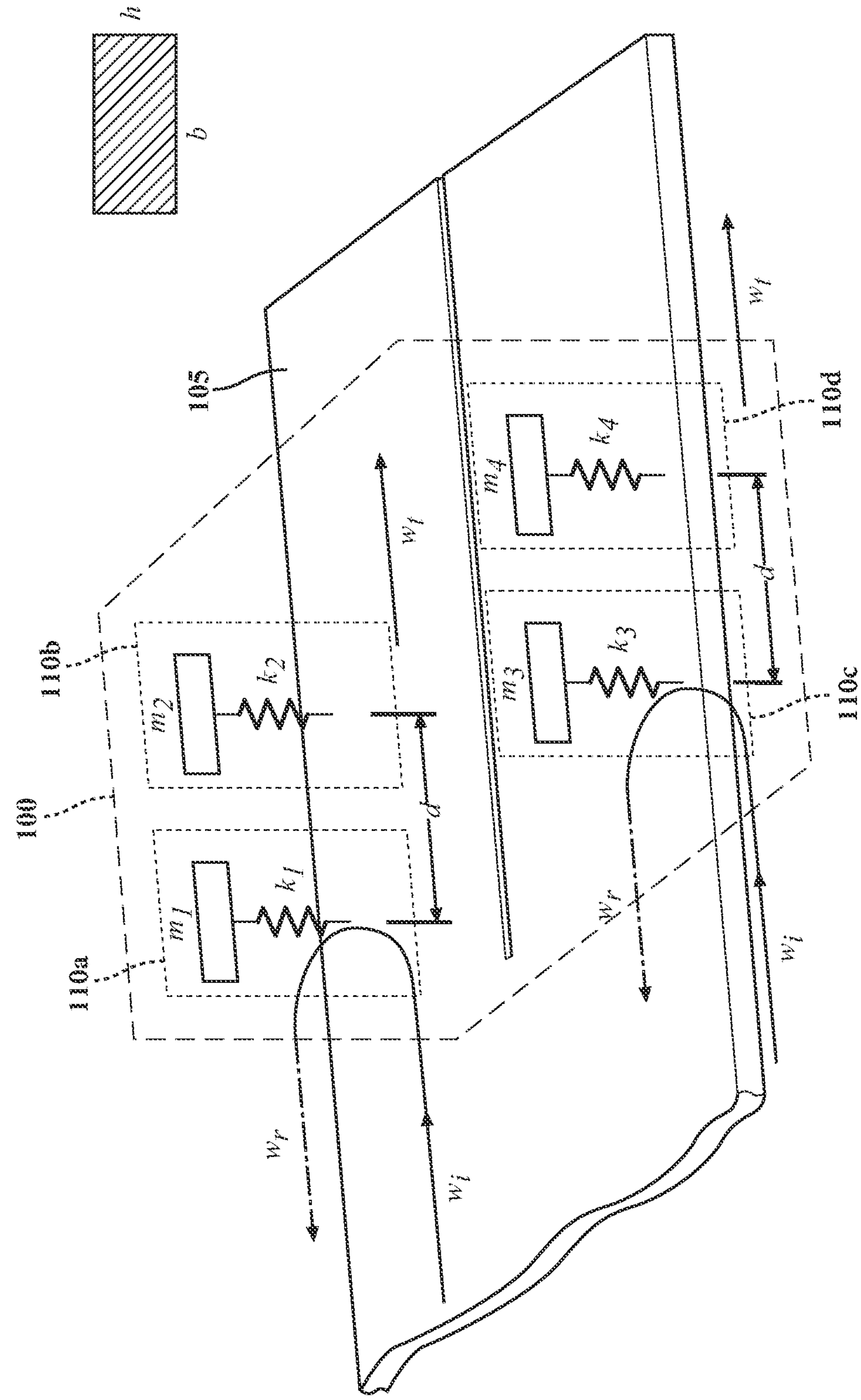
FIG. 12 illustrates one embodiment of an absorption system with multiple coupled mechanical resonators for transmitting target waves through a body while preventing non-target wave propagation on a plate.

FIG. 12 illustrates one embodiment of an absorption system 100 with multiple coupled mechanical resonators 110*a-d* for transmitting target waves through a body while preventing non-target wave propagation. In the example depicted in FIG. 12, the absorption system 100 includes a second bandpass filter that includes at least two additional mechanical resonators 110*c*, 110*d* aligned in a second linear array along the length dimension of the longitudinally extending body 105. This configuration may be referred to as a dual-resonator system. In some examples, the body 105 may include a slit to decouple the two resonator pairings.

In various aspects, one or more of the different bandpass filters may be designed to have a different resonance frequency. For example, it may be desirable to allow different flexural waves to transmit to a downstream structure. Accordingly, the absorption system 100 may be provided with asymmetric filters, for example, with a first bandpass filter targeting a first flexural wave with a first target wavelength and a second bandpass filter targeting a second flexural wave with a second target wavelength that is different from the first target wavelength.

In one example, the mechanical resonators 110*a*, 110*b* in the first bandpass filter may be identical to the mechanical resonators 110*c*, 110*d* in the second bandpass filter. However, in another example, the mechanical resonators in different bandpass filters may be different with regards to at least one of their physical properties (i.e., mass and spring constant), structure (i.e., channel, elevated mass, soft base etc.), components (i.e., spring, soft material, angled arm), and configuration (i.e., orientation as depicted in FIGS. 3-10). As such, different example resonators may be combined in any fashion, whether within a single or multiple bandpass filters. Accommodating different resonator forms in different bandpass filters supports customization in filtering the flexural waves as they propagate across the body 105.

Figure 13A:
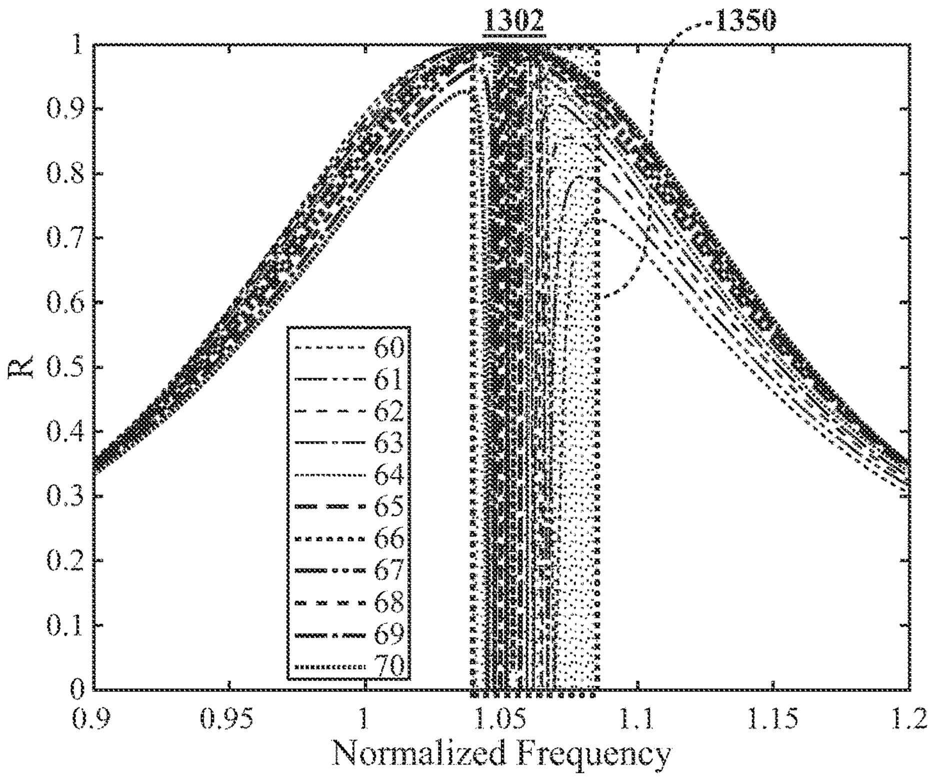
FIGS. 13A-13D are example graphs of flexural wave reflection of the bandpass filter absorption system.
Figure 13B:
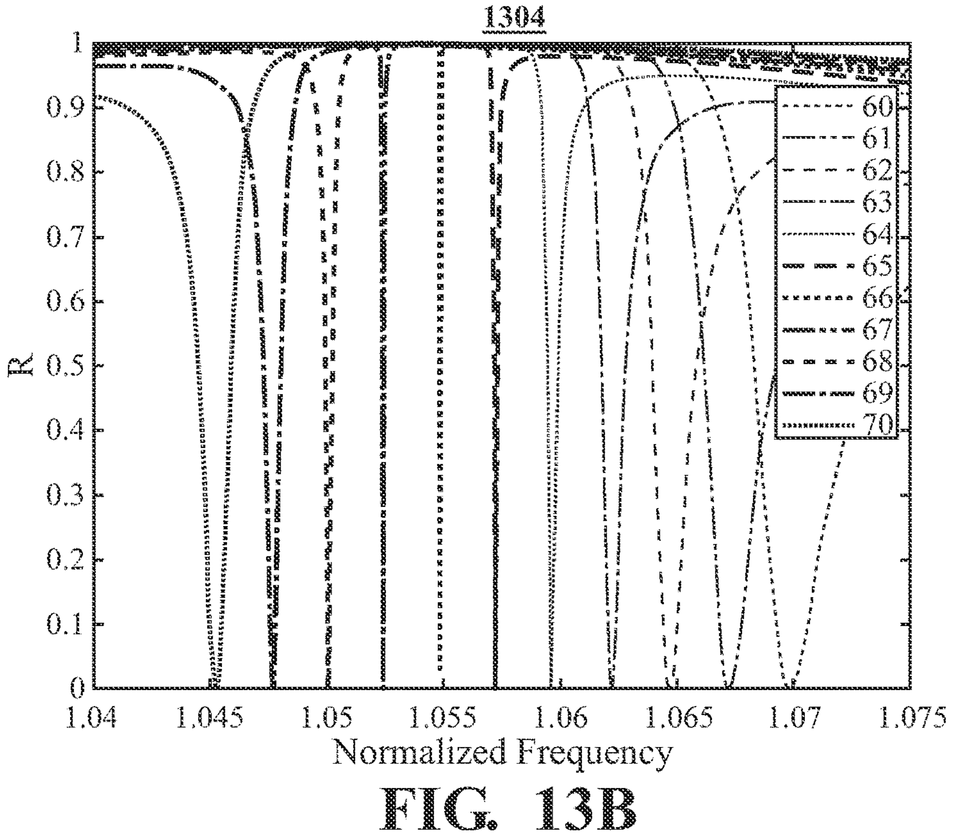
Figure 13C:
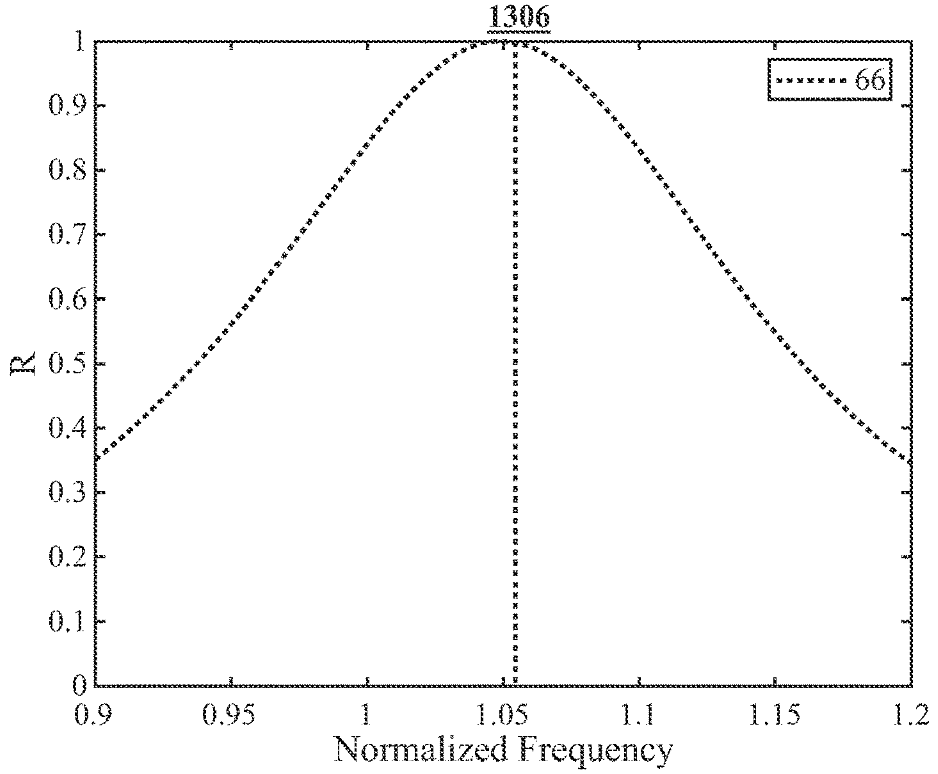
Figure 13D:
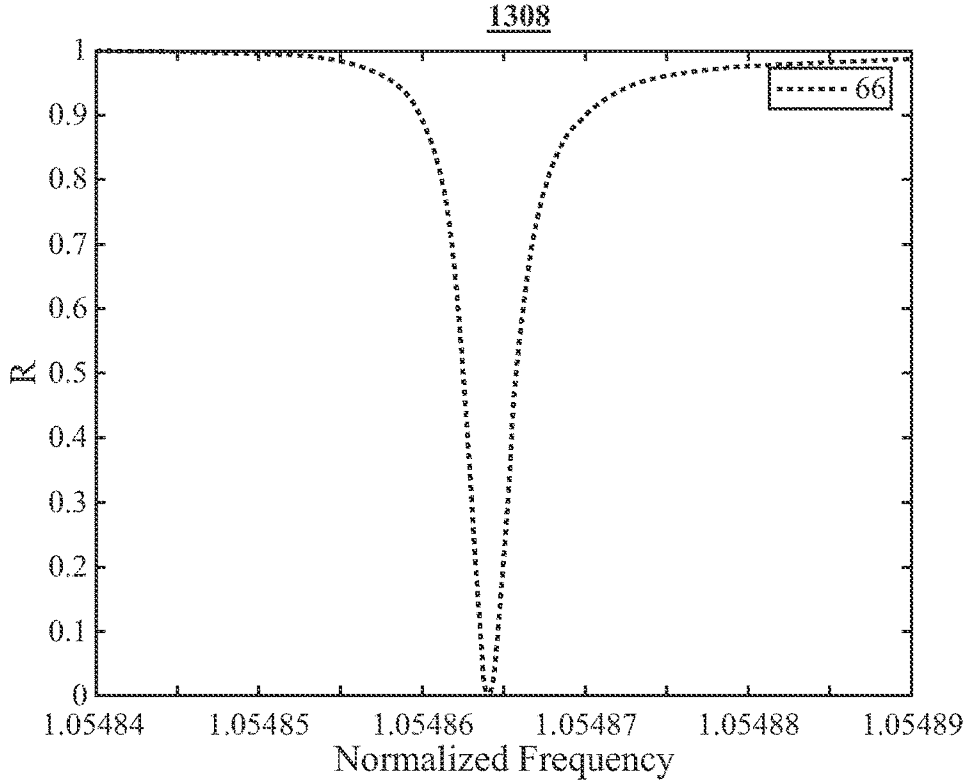

FIGS. 13A-13D are example graphs 1302, 1304, 1306, 1308 of flexural wave reflection coefficients of the bandpass filter absorption system 100 depicted in FIG. 1. Specifically, FIG. 13A depicts the calculated reflection coefficient for an absorption system 100 as functions of normalized frequency, f, and the inter-resonator distance, d. FIG. 13B is a zoomed-in view of the box 1350 depicted in FIG. 13A. As depicted in FIGS. 13A and B, the passing bandwidth changes based on a spacing between the mechanical resonators 110*a*, 110*b*, with the narrowest and highest reflection coefficient occurring at a value d=66 mm. FIGS. 13C and 13D depict graphs 1306, 1308 of the reflection coefficient for the absorption system 100 when the mechanical resonators are at a distance, d, of 66 mm away from each other at different x-scales.

Figure 14:
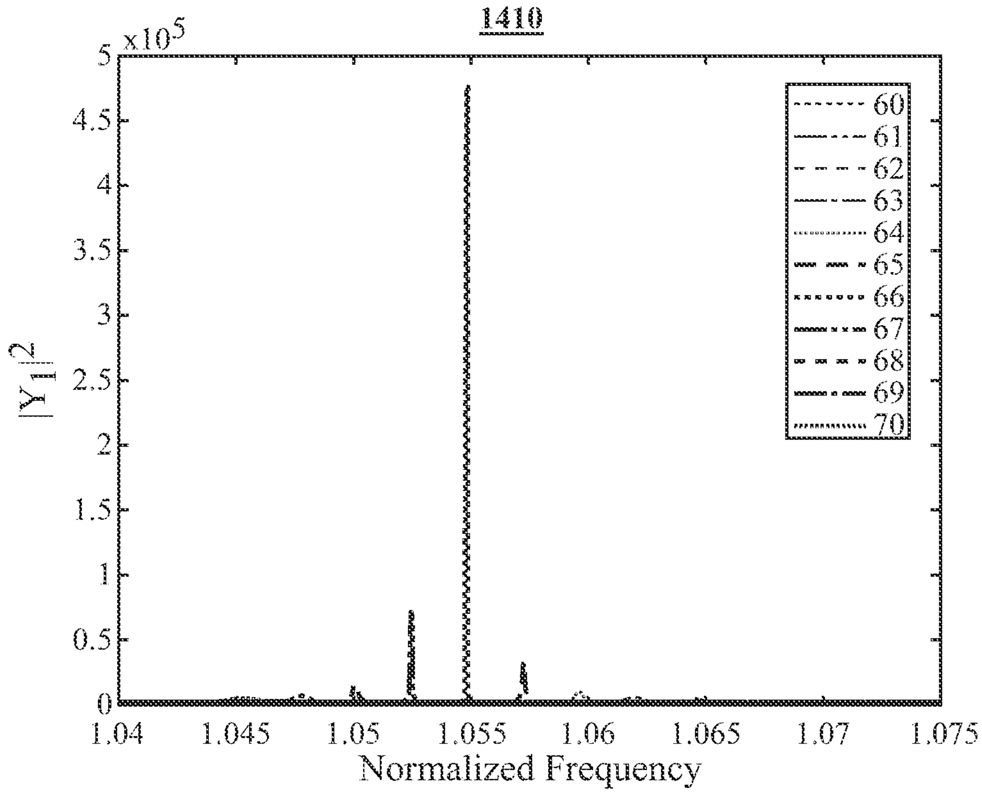
FIG. 14 is an example graph of a response of the mechanical resonators for different distances between the at least two mechanical resonators.

FIG. 14 is an example graph 1410 of a response of the mechanical resonators 110 for different distances between the at least two mechanical resonators 110. As indicated in FIG. 14, the resonator response is much larger and the bandwidth much narrower when the distance, d, is 66 mm which represents a calculated fraction of the magnitude of the target flexural wave wavelength, λ. This graph 1410 illustrates the high Q factor for an absorption system 100 targeted towards a particular target flexural wave to allow passage of the target flexural wave.

As such, the present specification describes an elastic embedded eigenstate with an unbounded Q factor and a narrow passing band. As such, the absorption system of the present specification provides for a flexural wave filter such that target flexural waves are propagated to a downstream system, such as a sensor system, while non-target flexural waves are suppressed. As such, the present system suppresses noise and vibration that would result were non-target flexural waves allowed to propagate past the absorption system.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-14, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a longitudinally extending body that is subject to a flexural wave;

a first bandpass filter, that transmits a target flexural wave having a particular wavelength and blocks a non-target flexural wave, comprising at least two mechanical resonators coupled to a surface of the longitudinally extending body and aligned in a first linear array along a length dimension of the longitudinally extending body, the at least two mechanical resonators being separated by a distance based on the particular wavelength and physical properties of the at least two mechanical resonators; and a second bandpass filter comprising at least two additional mechanical resonators, the second bandpass filter is decoupled from the first bandpass filter.

2. The system of claim 1, wherein the at least two mechanical resonators are separated by a distance that is greater than 0.45$\lambda$, where $\lambda$ is the particular wavelength.

3. The system of claim 1, wherein the second bandpass filter comprising at least two additional mechanical resonators is aligned in a second linear array along the length dimension of the longitudinally extending body, the second bandpass filter:

is parallel to the first bandpass filter along the length dimension of the longitudinally extending body;

is asymmetrical to the first bandpass filter; and targets a second target flexural wave with a different wavelength than the target flexural wave.

4. The system of claim 1, wherein each mechanical resonator comprises a channel in the surface of the longitudinally extending body.

5. The system of claim 1, wherein each mechanical resonator comprises:

a rigid mass component; and a connecting element connected to the rigid mass component, the connecting element maintains the rigid mass component at an elevated distance from the longitudinally extending body.

6. The system of claim 5, wherein the connecting element comprises one of:

a spring;

a soft base component; and a rigid base component and an arm extending at an angle from the rigid base component.

7. The system of claim 6, wherein:

arms of the at least two mechanical resonators extend in a same direction along the length dimension of the longitudinally extending body.

8. The system of claim 6, wherein:

arms of the at least two mechanical resonators extend in opposite directions along the length dimension of the longitudinally extending body; and the rigid mass components of the at least two mechanical resonators are adjacent one another.

9. The system of claim 6, wherein:

arms of the at least two mechanical resonators extend in opposite directions along the length dimension of the longitudinally extending body; and the rigid mass components of the at least two mechanical resonators are separated from one another by respective arms.

10. A system, comprising:

a longitudinally extending body that is subject to a flexural wave;

a first bandpass filter, that transmits a target flexural wave having a particular wavelength and blocks a non-target flexural wave, comprising at least two mechanical resonators coupled to a surface of the longitudinally extending body and aligned in a linear array along a length dimension of the longitudinally extending body, the at least two mechanical resonators being separated by a distance:

based on physical properties of the at least two mechanical resonators;

that is greater than $0.45\lambda$, where $\lambda$ is the particular wavelength; and a second bandpass filter comprising at least two additional mechanical resonators, the second bandpass filter is decoupled from the first bandpass filter.

11. The system of claim 10, wherein the second bandpass filter comprising at least two additional mechanical resonators is aligned in a second linear array along the length dimension of the longitudinally extending body, the second bandpass filter:

is parallel to the first bandpass filter along the length dimension of the longitudinally extending body;

is asymmetrical to the first bandpass filter; and targets a second target flexural wave with a different wavelength than the target flexural wave.

12. The system of claim 10, wherein each mechanical resonator comprises a channel in the surface of the longitudinally extending body.

13. The system of claim 10, wherein each mechanical resonator comprises:

a rigid mass component; and a connecting element connected to the rigid mass component, the connecting element maintains the rigid mass component at an elevated distance from the longitudinally extending body.

14. The system of claim 13, wherein the connecting element comprises one of:

a spring;

a soft base component; and a rigid base component and an arm extending at an angle from the rigid base component.

15. The system of claim 14, wherein:

arms of the at least two mechanical resonators extend in a same direction along the length dimension of the longitudinally extending body.

16. The system of claim 14, wherein:

arms of the at least two mechanical resonators extend in opposite directions along the length dimension of the longitudinally extending body; and the rigid mass components of the at least two mechanical resonators are adjacent to one another.

17. The system of claim 14, wherein:

arms of the at least two mechanical resonators extend in opposite directions along the length dimension of the longitudinally extending body; and the rigid mass components of the at least two mechanical resonators are separated from one another by respective arms.

* * * * *